Patented Dec. 16, 1952

2,622,011

UNITED STATES PATENT OFFICE 2,622,011

PROCESS OF TREATING METATITANIC ACID

Max J. Mayer, Scarsdale, N. Y.

No Drawing. Original application October 24, 1946, Serial No. 705,495. Divided and this application October 18, 1950, Serial No. 190,890

6 Claims. (Cl. 23—202)

This invention relates to the production of metatitanic acid and has particular reference to improvements in processes whereby objectionable conditions and practices incident to prior processes are eliminated.

The raw materials for industrial production of titanium dioxide are ilmenite and sulfuric acid. Ilmenite is attacked by sulfuric acid at elevated temperatures and, after dissolution, the resulting solutions vary in concentration of $TiO_2$, $H_2SO_4$, ferrous sulfate and other minor metallic impurities that are in the form of sulfates, such as magnesium sulfate, aluminum sulfate, etc.

A typical solution, is of the following composition:

| | Grams per liter |
|---|---|
| Total $TiO_2$ | 200 |
| Reduced $TiO_2$ | 2 |
| Fe | 60 |
| Total $H_2SO_4$ | 550 |
| Active $H_2SO_4$ | 445 |

In order to have all of the iron sulfate in divalent form, the solutions are reduced with iron, zinc, or other suitable material, until a small amount of trivalent titanium is formed. A seeding agent in the form of metatitanic acid or dispersed metatitanic acid sol is then added, after which the solution is heated to the boiling point to effect hydrolysis. The resulting precipitate consists of metatitanic acid which contains varying amounts of sulfuric acid, i. e. between 8% and 12% calculated on the basis of $TiO_2$. The sulfuric acid is not absorbed by the $TiO_2$ but forms part of the crystal lattice. Recoveries of metatitanic acid hydrolysate amount to 90-98% of the $TiO_2$ in the solution. After filtration, the hydrolysate is washed with dilute sulfuric acid until the iron content of the metatitanic acid is less than 0.01%. The filtered metatitanic acid pulp then consists of about

| | Per cent |
|---|---|
| $TiO_2$ | 35 |
| $H_2SO_4$ | 3.5 |
| Water | 61.5 |

The sulfuric acid content of the precipitate can be removed by calcination at high temperatures. For nearly complete removal of the $SO_3$, a temperature above 800° C. is required. The following Table I shows the effect of heat treatment upon the removal of sulfuric acid from the $TiO_2$. $TiO_2$ so treated had originally 9.37% $H_2SO_4$ on the basis of $TiO_2$ content. The material was heated to 350° C. which was maintained for one hour. A test sample was taken and tested for $H_2SO_4$ content. The calcination temperature was then raised to 450° C. and maintained for one hour, after which another sample was taken for analysis of the $H_2SO_4$ content. The heating was continued in like manner at the stages of 550° C., 600° C. and 750° C., the temperature maintained for one hour at each of these stages, with a sample being taken at the end of each stage for determination of the $H_2SO_4$ content.

Table I

| Temperature | $H_2SO_4$ Content |
|---|---|
| | Percent |
| Unheated | 9.37 |
| 350° C | 8.67 |
| 450° C | 6.18 |
| 550° C | 3.25 |
| 600° C | 2.06 |
| 750° C | 0.92 |

During calcination, the metatitanic acid undergoes considerable shrinkage and is converted to calcined $TiO_2$ of anatase structure. The chemical reactivity of such $TiO_2$ is very slight. Sulfuric acid and alkaline solutions show very little or no reaction thereto.

A better procedure than calcination for removal of the $H_2SO_4$ in the precipitated metatitanic acid—purified by washing as heretofore described—consists in further treatment with alkali. After complete neutralization, the resulting sulfate solution is removed by washing, preferably with condensed or deionized water. The washing at the outset causes no difficulty but, after most of the sulfate solution is removed, the precipitate begins to peptize, i. e., becomes colloidal. The filtration is then very difficult, and handling of large quantities becomes well-nigh impossible. The change of particle size incident to colloidization of the precipitate is highly undesirable for many purposes.

Among the objects of this invention is to provide a process whereby the foregoing peptization or colloidization is avoided, so that the washing and filtration may be carried out efficiently and rapidly.

A still further object of this invention is to avoid the foregoing peptization by inexpensive means and without impairing the value of the purified metatitanic acid for use in production of high quality titanium dioxide pigment.

Other, further, and more specific objects of this invention will become readily apparent to persons skilled in the art from a consideration of the following description.

According to the present invention, the metatitanic acid is slurried with water and to the slurry is added a solution of salts of elements which form with the hydroxides and carbonates of ammonium and of the alkali metals water-insoluble, white hydroxides, carbonates, or basic carbonates, that calcine to white oxides. In lieu of the water-soluble salts, the corresponding oxides, hydroxides, carbonates or basic carbonates of these elements may be employed. These will react with some of the $SO_4$ content of the metatitanic acid to form soluble sulfates of these elements.

Compounds of the elements of groups 2 to 5 of the periodic table, viz., those forming the aforementioned white, insoluble oxides, hydroxides, carbonates or basic carbonates, can be used according to this invention. The preferred compounds are those of Be, Cd, Al, Mg, Zn, La, Zr, Ce, Th, Cb, Sb and Ta, either alone or in combination. Compounds of elements which form insoluble sulfates, such as the Ca, Ba, Sr and Pb compounds, are not suitable.

Neutralization of the $H_2SO_4$ in the metatitanic acid, and precipitation of the white, insoluble hydroxides, carbonates, or basic carbonates, are then effected with aqueous solutions of the above-mentioned alkaline materials. Since a surplus of the alkaline reagents is not objectionable, pH values greater than 7 may be employed.

Instead of first adding the salts to the metatitanic acid, the reverse procedure of first adding the alkaline reagent may be used. In this case, a surplus of alkali above the amount necessary for the neutralization of the $H_2SO_4$ content must be employed. To the resulting slurry are added the water-soluble salts of the elements that form with the alkaline reagents, water-insoluble, white hydroxides, carbonates, or basic carbonates that remain white even after heating. Owing to the surplus of alkaline reagent, the hydroxides, carbonates, or basic carbonates are precipitated.

Another procedure consists in adding the insoluble oxides, hydroxides, carbonates, or basic carbonates to the neutralized metatitanic acid, with thorough stirring.

In all of the above cases, owing to the presence of the insoluble oxides, hydroxides, carbonates, or basic carbonates in the metatitanic acid, substantially all of the sulfates can be washed out without any peptization or colloidization of the precipitate.

The minimum amount of insoluble oxides, hydroxides, carbonates, or basic carbonates, calculated as metal oxides and based on the $TiO_2$ content of the metatitanic acid, is 0.1%. The preferred amounts are between 0.1–2.0% although larger amounts may be used, even up to 6%, calculated as metal oxides, as disclosed in my co-pending application Serial No. 705,493, filed October 24, 1946, now abandoned.

Instead of using the above-mentioned insoluble compounds of elements of groups 2 to 5 of the periodic table, other sufficiently water-insoluble organic acid salts forming white oxides on calcination can likewise be employed. For instance, insoluble salts of magnesium, zinc, aluminum, beryllium, etc., and myristic, palmitic, stearic, oleic, linoleic, linolenic and ricinoleic acids and their homologues can be used. Also, the insoluble salts of polybasic acids, such as sebacates, adipates, etc., can be employed.

The amount of compounds of the di-, tri-, tetra-, or pentavalent elements added to the metatitanic acid is from 0.1% to 6% calculated as metallic oxides based on the $TiO_2$ content of the metatitanic acid, as in my co-pending application Serial No. 705,493, now abandoned.

The following examples will serve to illustrate the practice of this invention.

*Example I*

A titanium sulfate solution, such as recovered from the $H_2SO_4$ attack of ilmenite, and containing

| | Grams per liter |
|---|---|
| Total $TiO_2$ | 180 |
| Reduced $TiO_2$ | 3.2 |
| Fe | 69.5 |
| Total $H_2SO_4$ | 483 |
| Active $H_2SO_4$ | 361 | is boiled in the presence of known seed. The metatitanic acid is precipitated after 2 hours of boiling. The precipitate is filtered and washed with 1–3% sulfuric acid, until substantially iron-free. The resulting metatitanic acid hydrate is then ready for use in the present invention and in all of the examples.

100 grams of the metatitanic acid hydrate—containing 35 grams of $TiO_2$, 3.5 grams of $H_2SO_4$, and 61.5 grams of water—is treated with 3.5 c. c. of a 10% magnesium sulfate solution, equivalent to 0.2% magnesium metal based on the $TiO_2$ content of the precipitate, and enough water is added to give a thick slurry which normally contains between 200 and 300 grams $TiO_2$ per liter. Enough of a 20% solution of either soda ash or caustic soda is added with stirring so that, after neutralization, a pH of 10–12 results with precipitation of magnesium carbonate. The concentration of the soda ash or caustic soda may vary widely. The precipitate is washed with water until substantially free of sodium sulfate. No peptization or colloidization is observed.

If the same procedure is repeated without the addition of the magnesium sulfate, the precipitate starts to become colloidal after a substantial part of the sodium sulfate is removed.

Compounds of Mg and Zn are operative when alkali metal compounds are used for neutralization, but are not operative when ammonium compounds are used for neutralization, because, surprisingly, I have found that any small amount of ammonium sulfate thus formed promotes solubility of the magnesium hydroxide.

*Example II*

To 100 grams of titanium dioxide in the form of metatitanic acid precipitate is added 6.2 c. c. of a 20% $ZnSO_4$ solution equivalent to 0.5% zinc metal based on the $TiO_2$ content of the precipitate. Enough water is added to yield a thick slurry, and this slurry is added to a 20% sodium carbonate solution until a pH of 8 is obtained which results in precipitation of zinc carbonate. Then the mixture is filtered and the precipitate is washed until substantially free of sulfate. No colloidization occurs.

As in Example I, I have also discovered that any small amount of ammonium sulfate that is formed—if ammonia or ammonium carbonate be used in lieu of sodium carbonate—promotes solubility of the zinc hydroxide.

*Example III*

To a thick aqueous slurry of metatitanic acid precipitate containing 350 grams $TiO_2$ is added 1.29 grams of zinc oxide equivalent to 0.3% zinc metal based on the $TiO_2$ content of the precipitate. Thorough agitation is maintained in order to react the ZnO with the sulfuric acid of the metatitanic acid, resulting in the formation of $ZnSO_4$. Then a 20% soda ash solution is added until a pH of 7.5 is reached which results in precipitation of zinc carbonate. The precipitate is washed with water until substantially free of sodium sulfate. No colloidization takes place.

Comparable, satisfactory results have been obtained with magnesium oxide or mixtures of zinc oxide and magnesium oxide in lieu of zinc oxide. Where magnesium oxide is used, the pH is preferably raised to 10–12, but pH values of 7 to 12 may be employed when compounds of the other designated metals of groups 2 to 5 of the periodic table are used.

*Example IV*

To an aqueous slurry of metatitanic acid precipitate containing 70 grams $TiO_2$ is added a 10% soda solution in excess of that necessary to neutralize the $H_2SO_4$ content of the metatitanic acid. To this is added 3.2 grams of anhydrous beryllium sulfate in the form of 64 grams of a 5% beryllium sulfate solution. After sufficient stirring, the precipitate of metatitanic acid and beryllium hydroxide is washed until substantially free of soluble salts. No peptization occurs.

*Example V*

An aqueous slurry of metatitanic acid precipitate containing 350 grams $TiO_2$ is neutralized with a 10% soda ash solution. 6.8 grams $Mg(OH)_2$ is added as a water slurry and the whole mixture thoroughly agitated. The slurry is filtered and washed free of soluble salts, without encountering peptization.

*Example VI*

A slurry of metatitanic acid precipitate containing 350 grams $TiO_2$ is neutralized with a 15% $K_2CO_3$ solution. 13.4 grams of zinc carbonate is added as a water slurry and the whole mixture thoroughly agitated. The slurry is filtered and washed free of soluble salts, without encountering peptization.

The use of corresponding ammonium compounds for neutralization before introduction of the compound of the specified class of metals is embodied in the claims of my co-pending application Ser. No. 190,889, filed October 18, 1950; the use of corresponding ammonium compounds for neutralization after introduction of the compound of the specified class of metals is embodied in the claims of my co-pending application Ser. No. 705,494; and the use of alkali metal compounds for neutralization after introduction of the compound of the specified class of metals is embodied in the claims of my co-pending application Ser. No. 705,495, filed on even date with application Ser. No. 705,494 on October 24, 1946.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

This application is a division of my application Serial No. 705,495, filed October 24, 1946.

I claim as my invention:

1. In a process of removing the $SO_4$ impurity from metatitanic acid produced by hydrolysis of an aqueous sulfuric acid solution of titanium sulfate, introducing into a slurry of said metatitanic acid a member of the alkaline group consisting of the alkali metal hydroxides, carbonates and basic carbonates to a 7–12 pH, then introducing into the slurry at least one member of the group consisting of the water-soluble salts, the oxides, hydroxides, carbonates and basic carbonates of Be, Cd, Al, Mg, Zn, La, Zr, Ce, Th, Cb, Sb and Ta in amount equal to 0.1 to 6 per cent calculated as metal oxide based on the $TiO_2$ content of the metatitanic acid, said member of the alkaline group being in sufficient amount to neutralize all of the $SO_4$ content of the metatitanic acid and to react with any salt in the slurry resulting from the introduction of the member of the group consisting of the water-soluble salts, the oxides, hydroxides, carbonates and basic carbonates of said class of metals consisting of Be, Cd, Al, Mg, Zn, La, Zr, Ce, Th, Cb, Sb and Ta, filtering and then washing the residue until substantially free of soluble salts.

2. The process claimed in claim 1, wherein the metal of the class is beryllium.

3. The process claimed in claim 1, wherein the metal of the class is magnesium.

4. The process claimed in claim 1, wherein the metal of the class is zinc.

5. In a process of removing the $SO_4$ impurity from metatitanic acid produced by hydrolysis of an aqueous sulfuric acid solution of titanium sulfate, introducing into a slurry of said metatitanic acid a member of the alkaline group consisting of the alkali metal hydroxides, carbonates and basic carbonates to a 7–12 pH, then introducing into the slurry at least one member of the group consisting of the water-soluble salts of Be, Cd, Al, Mg, Zn, La, Zr, Ce, Th, Cb, Sb and Ta in amount equal to 0.1 to 6 per cent calculated as metal oxide based on the $TiO_2$ content of the metatitanic acid, said member of the alkaline group being in sufficient amount to neutralize all of the $SO_4$ content of the metatitanic acid and to react with any salt in the slurry resulting from the introduction of the member of the group consisting of the water-soluble salts of said class of metals consisting of Be, Cd, Al, Mg, Zn, La, Zr, Ce, Th, Cb, Sb and Ta, filtering and then washing the residue until substantially free of soluble salts.

6. In a process of removing the $SO_4$ impurity from metatitanic acid produced by hydrolysis of an aqueous sulfuric acid solution of titanium sulfate, introducing into a slurry of said metatitanic acid a member of the alkaline group consisting of the alkali metal hydroxides, carbonates and basic carbonates to a 7–12 pH, then introducing into the slurry at least one member of the group consisting of the oxides, hydroxides, carbonates and basic carbonates of Be, Cd, Al, Mg, Zn, La, Zr, Ce, Th, Cb, Sb and Ta in amount equal to 0.1 to 6 per cent calculated as metal oxide based on the $TiO_2$ content of the metatitanic acid, said member of the alkaline group being in sufficient amount to neutralize all of the $SO_4$ content of the metatitanic acid, filtering and then washing the residue until substantially free of soluble salts.

MAX J. MAYER.

REFERENCES CITED

The following references are of record in the file of this patent:

UNITED STATES PATENTS

| Number | Name | Date |
| --- | --- | --- |
| 1,750,287 | Specht | Mar. 11, 1930 |